United States Patent
Choi et al.

(10) Patent No.: US 6,529,317 B2
(45) Date of Patent: Mar. 4, 2003

(54) L-BAND ERBIUM-DOPED FIBER AMPLIFIER PUMPED BY 1530 NM-BAND PUMP

(75) Inventors: Bo-Hun Choi, Seoul (KR); Moo-Jung Chu, Taejon (KR); Seung-Kwan Kim, Taejon (KR); Jyung-Chan Lee, Taejon (KR); Hyo-Hoon Park, Taejon (KR)

(73) Assignee: Electronics and Telecommunications Research Institute (KR)

( * ) Notice: Subject to any disclaimer, the term of this patent is extended or adjusted under 35 U.S.C. 154(b) by 0 days.

(21) Appl. No.: 09/752,549

(22) Filed: Dec. 29, 2000

(65) Prior Publication Data

US 2001/0050803 A1 Dec. 13, 2001

(30) Foreign Application Priority Data

Jun. 8, 2000 (KR) .............................. 00-31334

(51) Int. Cl.⁷ ................................. H01S 3/00
(52) U.S. Cl. ................................. 359/341.31
(58) Field of Search ........................ 359/357.1, 341.1, 359/341.31

(56) References Cited

U.S. PATENT DOCUMENTS

| | | | | |
|---|---|---|---|---|
| 4,955,025 | A | | 9/1990 | Mears et al. ............... 372/6 |
| 5,140,456 | A | | 8/1992 | Huber ....................... 359/341 |
| 5,500,764 | A | * | 3/1996 | Armitage et al. ........... 359/341 |
| 6,049,414 | A | * | 4/2000 | Espindola .................. 359/337 |
| 6,081,369 | A | * | 6/2000 | Waarts et al. .............. 359/341 |
| 6,201,637 | B1 | * | 3/2001 | Nilsson et al. ............. 359/341 |
| 6,288,834 | B1 | * | 9/2001 | Sugaya et al. ............. 359/341.1 |

FOREIGN PATENT DOCUMENTS

| | | | |
|---|---|---|---|
| JP | 09-185090 | 7/1997 | ............ G02F/1/35 |
| JP | 02001127365 A | * 5/2001 | ............ H01S/3/10 |
| JP | 02001189510 A | * 7/2001 | ............ H01S/3/06 |

OTHER PUBLICATIONS

Kean et al., "Pump Induced Inhomogeneity of Gain Spectra in Conventional and Extended–Band EDFAs", OFC 1999, p21–26 Feb. 1999, pp. 10–12, vol. 2.*
Lee et al., "Enhancement of Power Conversion Efficiency for an L–Band EDFA with Secondary Pumping Effect in the Unpumpe EDF Section", IEEE Photonics Technology Letters, vol. 11, No. 1, Jan. 1999.*
Hansen et al., "L–Band Erbium Doped Fiber Amplifiers—Theor and Design", Jan. 31, 2000, Master's Thesis.*
Massicott et al., "Low Noise Operation of Er3+ Doped Silica Fibre Amplifier Around 1.6 micrometers", Electronics Letters, 24$^{th}$ Sep. 1992, vol. 28, No. 20, pp. 1924–1925.*
Notice of Preliminary Objection, application No. 2000–0031334, Jun. 28, 2002.

* cited by examiner

*Primary Examiner*—Thomas G. Black
*Assistant Examiner*—Deandra M. Hughes
(74) *Attorney, Agent, or Firm*—Blakely Sokoloff Taylor & Zafman

(57) ABSTRACT

An improved long wavelength-band EDFA (L-band EDFA) is disclosed. The EDFA includes an input terminal for receiving signal light, a pumping unit for pumping a 1,530 nm wavelength band pumping light, a WDM coupler for multiplexing the signal light and the pumping light, and an EDF pumped by a 1,530 nm wavelength band pumping light for amplifying the signal light. Compared with conventional 1,480 nm pumping, the EDFA pumped by 1,530 nm band pumping have about two times higher power conversion efficiency.

10 Claims, 11 Drawing Sheets

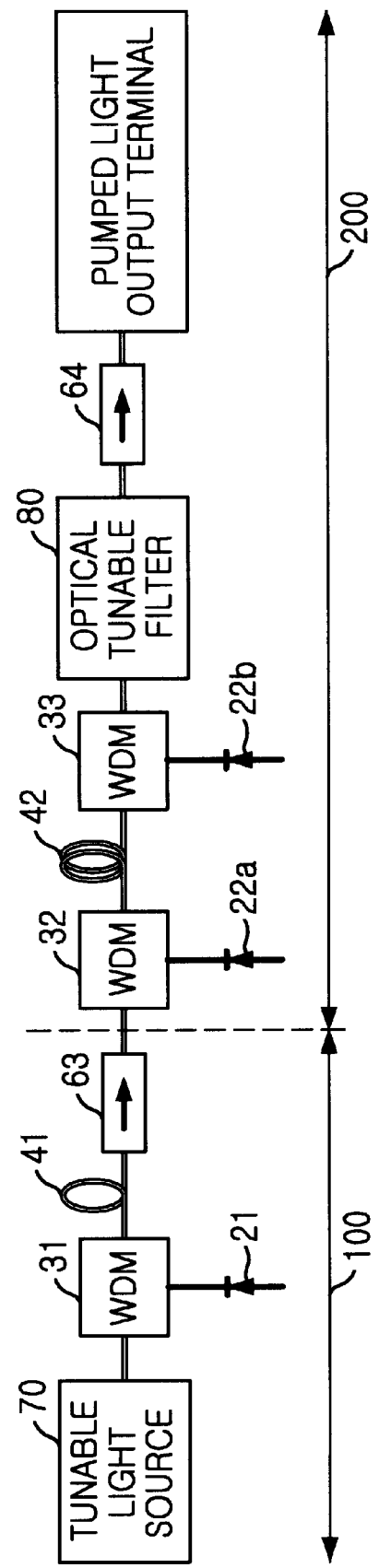

L-BAND ERBIUM-DOPED FIBER AMPLIFIER PUMPED BY 1530 NM-BAND PUMP

FIELD OF THE INVENTION

The present invention relates to an optical telecommunication system, and, more particularly, to an L-band erbium doped fiber amplifier (EDFA) employed therein.

DESCRIPTION OF THE PRIOR ART

Recently, a various transmission techniques have been developed to transmit a large amount of transmission information. One of the techniques is a wavelength division multiplexing (WDM) in which a number of channels having different wavelengths are simultaneously transmitted in a single optical fiber to increase the transmission capacity.

One of components in a transmission system using the WDM technique is an optical amplifier (OA) that amplifies an optical signal without converting from an optical signal to an electrical signal. This optical amplifier easily compensates an optical fiber transmission loss and/or a distribution network loss. Especially, as the optical amplifier, an erbium doped fiber amplifier (EDFA) is widely employed.

Since the EDFA amplifies the optical signal with a high gain at wavelength ranging from 1.52 $\mu$m to 1.63 $\mu$m wherein a transmission loss of an optical fiber is smallest, an optical transmission system utilizes the EDFA as an optical amplifier. In particular, the EDFA can amplify different wavelength optical signals at one time so that it is very useful at the WDM technique.

Generally, the EDFA comprises an erbium doped fiber (EDF) that serves as an optical amplification medium, a pumping light (PL) for pumping the doped erbium ions in the EDF, a WDM coupler for multiplexing the signal light and the pumping light, and an optical isolator (ISO) for passing a forwardly progressing optical light and blocking a backwardly progressing optical light by reflection. When the pumping light from the WDM coupler is inputted to the EDF, the erbium ions are pumped. While the inputted signal progresses along the EDF, the signal light is amplified and then the pumped erbium ions are transited to a low energy stage. The characteristic of the EDFA is represented as a gain and a noise figure.

The gain and the noise are largely influenced by the wavelength of the pumping light and the structure of the pump. The general wavelength of the pumping light is 980 nm or 1,480 nm.

The pumping method is classified according to the direction of the signal light and the pumping light. In case that the directions of both signal and pumping lights are identical, this is called as a forward pumping. In case that the directions of both signal and pumping lights are not identical, this is called as a backward pumping. When the forward and the backward pumping are employed together, this is called as a bi-directional pump. In general, the forward pumping is effective in reducing the noise figure, while the backward pumping is effective in increasing the power conversion efficiency (PCE). Therefore, the pumping method is important to design the EDFA.

EDFA is divided as a conventional band (C-band) EDFA amplifying the signal of 1,550 nm wavelength band, and a long band (L-band) EDFA amplifying the signal of 1,580 nm wavelength band. By advent of the L-band EDFA, optical communication bandwidth is expanded.

In a prior art, the pumping light is produced by a laser diode. The EDFA is constructed by fusing-coupling two optical fibers instead of the WDM coupler. In one application, the EDFA is used for a fiber ring laser (see, U.S. Pat. No. 4,955,025). As one of the pumping methods, a bi-directional pumping to forward pump by a 980 nm laser diode (LD) and to backward pump by a 1,480 nm LD is introduced to reduce a noise figure and increase a PCE of C-band EDFA (see, U.S. Pat. No. 5,140,456).

As another prior art, an L-band EDFA using a 980 nm LD as main pump and 1,550 nm DBF LD as a subsidiary pump with small power is provided to enhance the PCE at 1,570~1,600 nm wavelength band (See, R. Di Muro, N. E. Jolley, J. Mun. "Measurement of the Quantum Efficiency of long wavelength EDFAs with and without an idler signal" ECOC'98 technical digest, 20–24pp., Sep., 1998).

Hitherto, 980 nm and 1,480 nm wavelength are used as pump wavelengths for the L-band EDFA but the EDFA pumped by 1,530 nm wavelength band pump is not introduced.

SUMMARY OF THE INVENTION

It is, therefore, a primary object of the invention to present a 1,530 nm band pumped EDFA enabling L-band (1,570~1,600 nm) input light to be amplified by the 1,530 nm band pump, thereby increasing the PCE. The increase of the PCE means that the efficiency of pump power of the EDFA is enhanced.

It is another object of the invention to provide a two-stage amplifying structure using 1,530 nm band pump, thereby reducing a noise characteristic and increase a gain characteristic.

To achieve the above object, in one embodiment of the present invention, an L-band EDFA comprises: an input terminal for receiving signal light; a pumping unit for pumping a 1,530 nm wavelength band pumping light; a WDM coupler for multiplexing the signal light and the pumping light; and an EDF for amplifying the signal light by the pumping light; isolators for removing a reflection noise, each of which is located between the first amplifying stage and the second amplifying stage, and between the second amplifying stage and an output terminal.

The pumping unit on this embodiment has a first amplifying stage and a second amplifying stage. The first stage comprises a tunable light source that has a capability to change the wavelength of the pumping light, 980 nm wavelength laser diode for producing 980 nm wavelength forward pumping light, a first WDM coupler for multiplexing the output light from the tunable light source and the output light from the 980 nm wavelength laser diode, and a first EDF for amplifying the 1,530 nm band light provided from the first WDM coupler. The second amplifying stage comprises a first 1,480 nm wavelength LD for producing 1,480 nm wavelength forward pumping light, a second WDM coupler for multiplexing the output light from the first stage and the pumping light from the first 1,480 nm wavelength LD, a second 1,480 nm wavelength LD for producing 1,480 nm wavelength backward pumping light, a third WDM coupler for multiplexing the output light from the second 1,480 nm wavelength LD and the output light from the second WDM coupler, a second EDF for amplifying the 1,530 nm band light provided from the first amplifying stage, and an optical tunable filter for reducing the amplified spontaneous emission noise light from the amplified light at the second erbium doped fiber. In addition, To achieve the above object, in another embodiment of the present invention, an optical amplifier comprises: an input terminal for receiving an L-band signal light; a 980 nm LD for forward pumping 980 nm wavelength pumping light; a first WDM coupler for multiplexing the signal light and the pumping light; a 1,530 nm band LD for backward pumping 1,530 nm wavelength pumping light; a second WDM coupler for multiplexing the signal light and the 1,530 nm pumping light; a EDF for amplifying the signal light by bi-directional pumping lights; and two isolators to remove a reflection noise, each of which is located between the input terminal and the first wavelength division multiplexing unit, and coupled to an output terminal.

To achieve the above object, in still another embodiment of the present invention, an optical amplifier comprises: a first stage having an input terminal to which a signal light is inputted, 980 nm LD for forward pumping 980 nm wavelength pumping light, a first WDM coupler for multiplexing the signal light and the 980 nm wavelength pumping light, and a first EDF for amplifying the signal light provided from the first WDM coupler; and a said second amplifying stage having a first 1,530 nm LD for forward pumping 1,530 nm wavelength band pumping light, a second WDM coupler for multiplexing the output light from the first EDF and the pumping light from the first 1,530 nm LD, a second 1,530 nm LD for backward pumping 1,530 nm wavelength band pumping light, a third WDM coupler for multiplexing output light from the second WDM coupler and the output light from the second 1,530 nm LD, and a second EDF for amplifying the signal light from the first amplified stage by bi-directional pumping, wherein, said amplifier further comprises two isolators to remove a reflection noise, each of which is located between the first amplifying stage and the second amplifying stage, and between the second amplifying stage and an output terminal These and other features of the present invention are more fully shown and described in the drawings and detailed description of this invention. It is to be understood, however, that the description and drawings are for the purpose of illustration and should not be read in a manner that would unduly limit the scope of this invention.

BRIEF DESCRIPTION OF THE DRAWINGS

The above and other objects and features of the instant invention will become apparent from the following description of preferred embodiments taken in conjunction with the accompanying drawings, in which:

FIG. 2A shows a configuration of a 1,530 nm wavelength band pumping unit using two-stage amplifying structure and an optical tunable filter;

DETAILED DESCRIPTION OF THE INVENTION

Preferred embodiments of the present invention will now be described in detail, with reference to the accompanying drawings.

Figure 1:
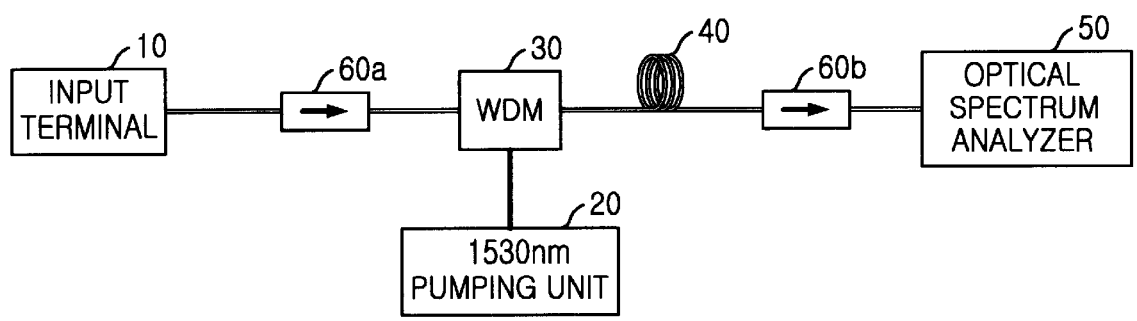
FIG. 1 is a configuration of a forward pumped L-band EDFA using 1,530 nm wavelength band pumping light in accordance with a first embodiment of the present invention.

FIG. 1 shows a configuration of a forward pumped L-band EDFA using 1,530 nm-wavelength-band-pumping light. At this configuration, the pumping is only forwardly performed, so that components which affect the characteristics of the EDFA is minimized to efficiently embody the effects according to a wavelength of the pumping light.

As shown in FIG. 1, the EDFA comprises an input terminal 10 to which an L-band input signal light is supplied, a pumping unit 20 for forwardly pumping an EDF 40 by 1,530 nm-wavelength-band-pumping light, a WDM coupler 30 for multiplexing the input signal light and the pumping light, an EDF 40 for amplifying the input signal light, and an optical spectrum analyzer (OSA) 50 for analyzing the spectrum of the amplified signal light. In addition, the EDFA has optical isolators 60a and 60b, each of which prevents a noise caused by the signal reflection. One isolator 60a is located between the input terminal 10 and the WDM coupler 30 and the other 60b is located between the EDF 40 and the OSA 50.

In the above described forward pumping EDFA, at the WDM coupler 30, 1,570~1,600 nm wavelength of the signal light inputted to the input terminal 10 is multiplexed with the 1,530 nm-wavelength-band-pumping light pumped at the pumping unit 20. And then, the pumping light pumps the EDF 40 and the signal light is amplified while it passes through the EDF 40. In this embodiment, the length of the EDF is approximately 65 m. The amplified light is measured at the optical spectrum analyzer 50.

At this time, a spontaneous emission noise from the pumping unit 20 may affect the characteristic of the L-band EDFA. In order not to affect the characteristic, at the WDM coupler 30, an insertion loss of the pumping light is designed to be large at the wavelength band of the input signal light.

On the EDFA in accordance with the first embodiment of the present invention, Since the use of 1,530 nm-wavelength-band light suppresses an amplified spontaneous emission (ASE) noise light on the EDF 40, the power conversion efficiency (PCE) of the EDFA becomes approximately two times higher than that of 1,480 nm pumping light.

Figure 2B:
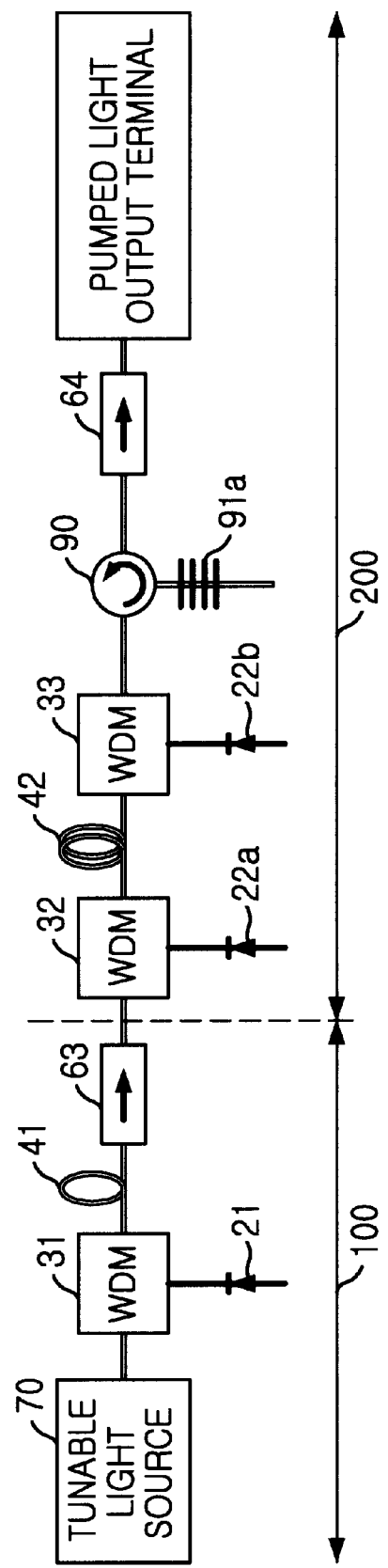
FIG. 2B describes a configuration of a 1,530 nm wavelength band pumping unit using two-stage amplifying structure, an optical circulator and an optical fiber Bragg grating.

FIGS. 2A and 2B represent the pumping unit of FIG. 1. Herein, two stages of amplifier are employed to generate 1,530 nm-wavelength band-pumping light.

As shown in FIG. 2a, a first amplifying stage 100 comprises a tunable light source (TLS) 70 which has a capability to change the output wavelength, 980 nm wavelength LD 21 for pumping 980 nm wavelength pumping light, a first WDM coupler 31 for multiplexing the output light from the tunable light source 70 and the output light from the LD 21, and a first EDF 41 for amplifying the 1,530 nm wavelength band light from the first WDM coupler 31. A second amplifying stage 200 comprises a first 1,480 nm wavelength band LD 22a for pumping 1,480 nm-wavelength-pumping light, a second WDM coupler 32 for multiplexing the output light from the first stage and the pumping light from the LD 22a, a second 1,480 nm wavelength band LD 22b for pumping 1,480 nm wavelength band pumping light, and a third WDM coupler 33 for multiplexing the output light from the LD 22b and the output light from the WDM coupler 32. Between the second WDM coupler 32 and the third WDM coupler 33, there is a second EDF 42 for amplifying the output light from the first amplifying stage 100. In addition, the second amplifying stage further comprises an optical tunable filter 80 for reducing the ASE noise light. On the other hand, between the first amplifying stage 100 and the second amplifying stage 200, there is employed an optical isolator 63 in order to remove a reflection noise. And also, between the second amplifying stage 200 and an output terminal, there is employed another optical isolator 64 removing another reflection noise.

Above described two-stage amplifying configuration can produce a pumping light of high power and change the wavelength of the pumping light by controlling the TLS 70. The first EDF 41 of the first amplifying stage 100 is forward pumped by 980 nm wavelength LD 21. The second EDF 42 is bi-directionally pumped by 1,480 nm wavelength LD 22a, and 1,480 nm LD 22b. At this time, The ASE noise light of the TLS 70 is also amplified with the lasing light of the TLS 70 at each EDF. The power of the ASE noise light at output pumping light is not small. In order to prevent the ASE noise light from affecting the signal light, an optical tunable filter (OTF) 80 is employed to eject the ASE noise light.

FIG. 2B shows another embodiment of the pumping unit of FIG. 1. Another pumping unit utilizes an optical circulator 90 and a fiber brag grating (FBG) 91a instead of the optical tunable filter 80 of FIG. 2a. When an amplified output light is inputted from the second EDF 42, the optical circulator 90 sends the output light to the FBG 91a. The FBG 91a reflects only the wavelength of the pumping wavelength light to pumped light output terminal so that the ASE is removed.

As described above, by using the reflection filter such as the FBG, the ASE noise light is efficiently removed.

Figure 2C:
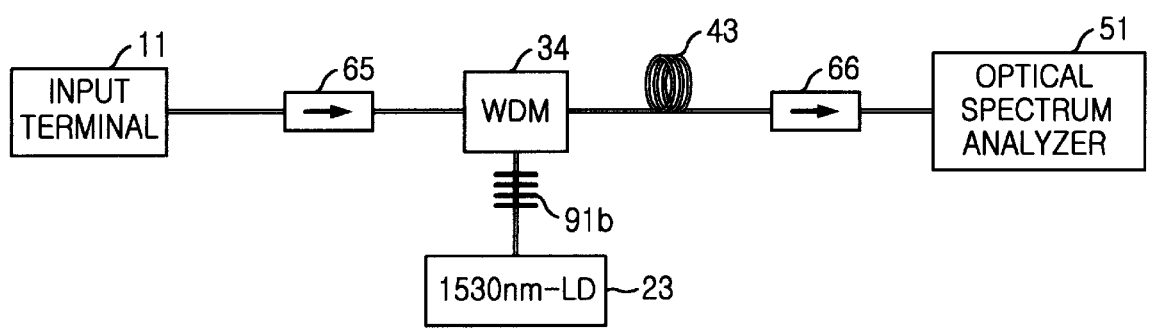
FIG. 2C is a configuration of a 1,530 nm wavelength band pumping unit using a laser diode and an optical fiber Bragg grating.

FIG. 2C shows a forward pumping configuration using 1,530 nm-wavelength-band LD.

As shown in FIG. 2C, the EDFA comprises an input terminal 11 to which a signal light is supplied, a 1,530 nm wavelength band LD 23 for producing 1,530 nm-wavelength-band-pumping light, a WDM coupler 34 for multiplexing the signal light and the pumping light, an EDF 43 for amplifying the signal light, and an optical spectrum analyzer (OSA) 51 for analyzing the spectrum of the amplified signal light. In addition, the EDFA has optical isolators 65 and 66, each of which prevents a noise caused by the signal reflection. One isolator 65 is located between the input terminal 11 and the WDM coupler 34 and the other isolator 66 is located between the EDF 43 and the OSA 51.

Herein, a single wavelength LD having FBG 91b is preferably employed to stabilize wavelength of the LD and to narrow wavelength band of the LD while the function of the FGB 91a performs a reflection, one of the FBG 91c performs a lasing at the Bragg wavelength. The insertion loss of the WDM coupler 34 is designed to greatly increase on longer wavelength than 1540 nm.

Figure 3:
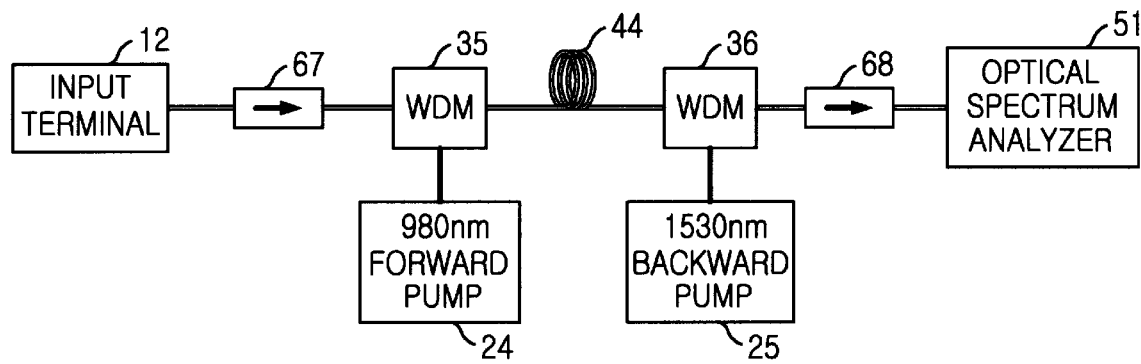
FIG. 3 describes a configuration of a bi-directional pumping structure of an L-band EDFA using a 980 nm wavelength band forward pumping and a 1,530 nm wavelength band backward pumping.

FIG. 3 shows a second embodiment of L-band EDFA having bi-directional pumping configuration.

As shown in FIG. 3, the EDFA comprises an input terminal 12 to which a signal light is supplied, a 980 nm wavelength LD 24 for producing 980 nm-wavelength-pumping light, a first WDM coupler 35 for multiplexing the signal light and the forward pumping light, a 1,530 nm wavelength band LD 25 for producing 1,530 nm-wavelength-band-pumping light, a second WDM coupler 36 for multiplexing the signal light and the backward pumping light, an EDF 44 for amplifying the signal light, and an optical spectrum analyzer (OSA) 51 for analyzing the spectrum of the amplified signal light. In addition, the EDFA has optical isolators 67 and 68, each of which prevents a noise caused by the signal reflection. One isolator 67 is located between the input terminal 12 and the first WDM coupler 35 and the other isolator 68 is located between the second WDN unit 36 and the OSA 51.

Above scribed configuration is used to get a lower noise figure and higher gain coefficient on the EDFA than using only forward 1,530 nm-wavelength-band-pumping light. The reason to use forward 980 nm wavelength pumping is known that it is more profitable for get the low noise figure on the EDFA than using other wavelength pumping.

Figure 4:
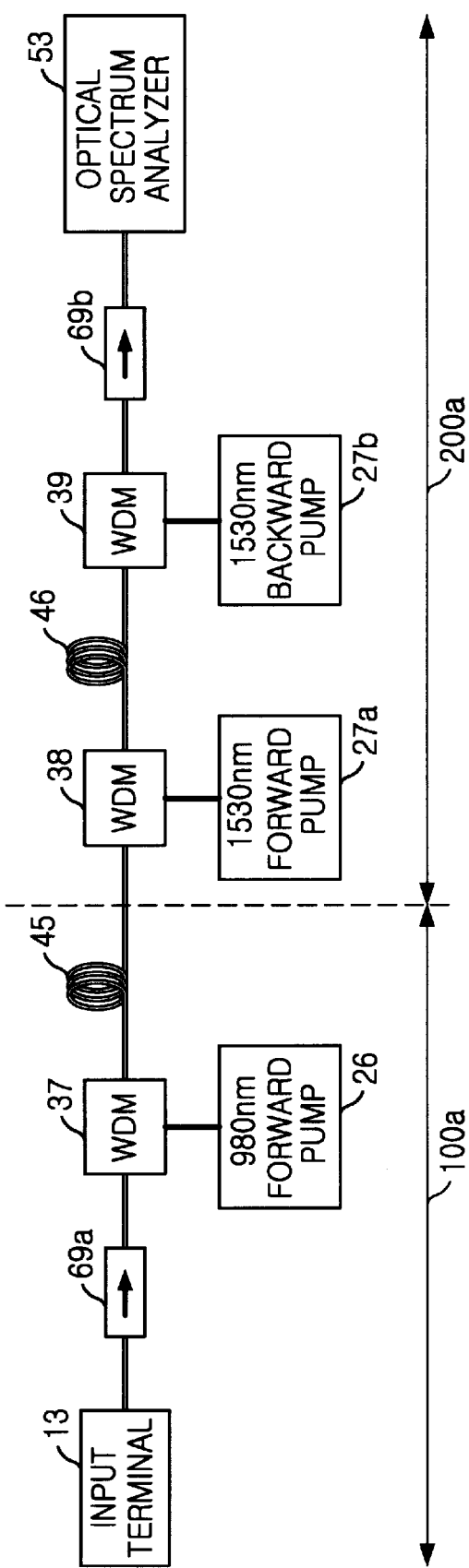
FIG. 4 illustrates a configuration of an L-band EDFA having a first amplifying stage in which 980 nm wavelength band pumping light is forwardly pumped, and a second amplifying stage in which 1,530 nm wavelength band pumping light is bi-directionally pumped.

FIG. 4 shows a third embodiment of EDFA in accordance with the present invention. The EDFA has two-stage amplifying configuration.

As shown in FIG. 4, the EDFA is consisted of a first stage 100a and a second stage 200a.

The first stage 100a comprises an input terminal 13 to which a signal light is supplied, a 980 nm wavelength LD 26 for producing 980 nm-wavelength-pumping light, a first WDM coupler 37 for multiplexing the signal light and the forward pumping light, and an EDF 45 for amplifying the signal light.

The second stage 200a comprises a first 1,530 nm forward pump 27a for producing 1,530 nm-wavelength-band-pumping light, a second WDM coupler 38 for multiplexing the light from the first stage 100a and 1,530 nm forward pumping light, a 1,530 nm backward pump 27b for producing 1,530 nm-wavelength-band-pumping light, a third WDM coupler 39 for multiplexing the light from the second WDM coupler 38 and the backward pumping light, and an EDF 46 for secondly amplifying the signal light. In addition, the EDFA has optical isolators 69a and 69b, each of which prevents a noise caused by the signal reflection. One isolator 69a is located between the input terminal 13 and the first WDM coupler 37 and the other isolator 69b is located between the third WDN unit 39 and the OSA 53.

In the two-stage EDFA, the noise decreases while the gain increases. The first EDF 45 at the first stage 100a is pumped by the 980 nm wavelength band LD 26, while a second EDF 46 at the second stage 200a is bi-directionally pumped by 1,530 nm wavelength band forward pump 27a and 1,530 nm backward pump 27b.

As described above, each of the embodiments in accordance with the present invention decreases the noise figure and increases the gain characteristic.

Figure 5:
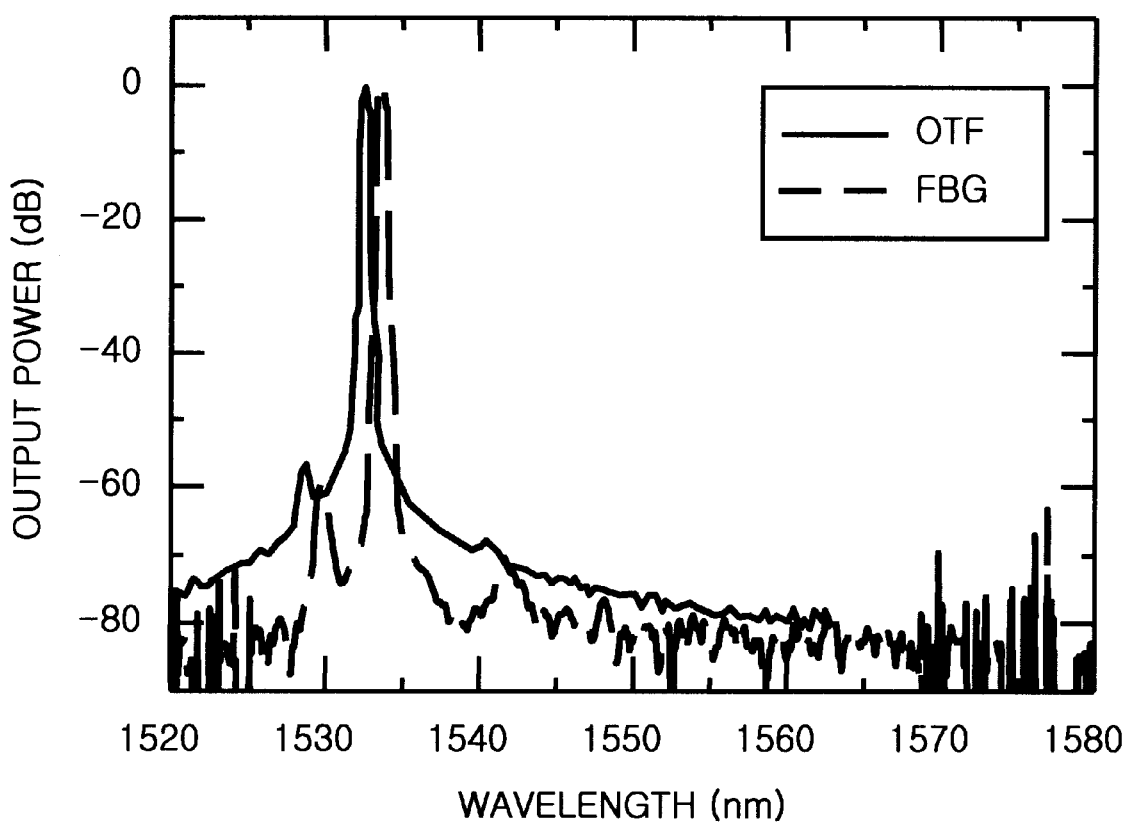
FIG. 5 is spectra of 1,530 nm wavelength band pumping light using an optical tunable filter and a fiber Bragg grating, respectively.

FIG. 5 shows spectra of 1,530 nm-wavelength-band-pumping light, in which the solid line is for the pump employing OTF and the dotted line is for employing FGB. The insertion loss is so large at longer wavelength than 1,560 nm that the ASE noise from the pumping light can not affect the amplification characteristics of the L-band EDFA.

Figure 6:
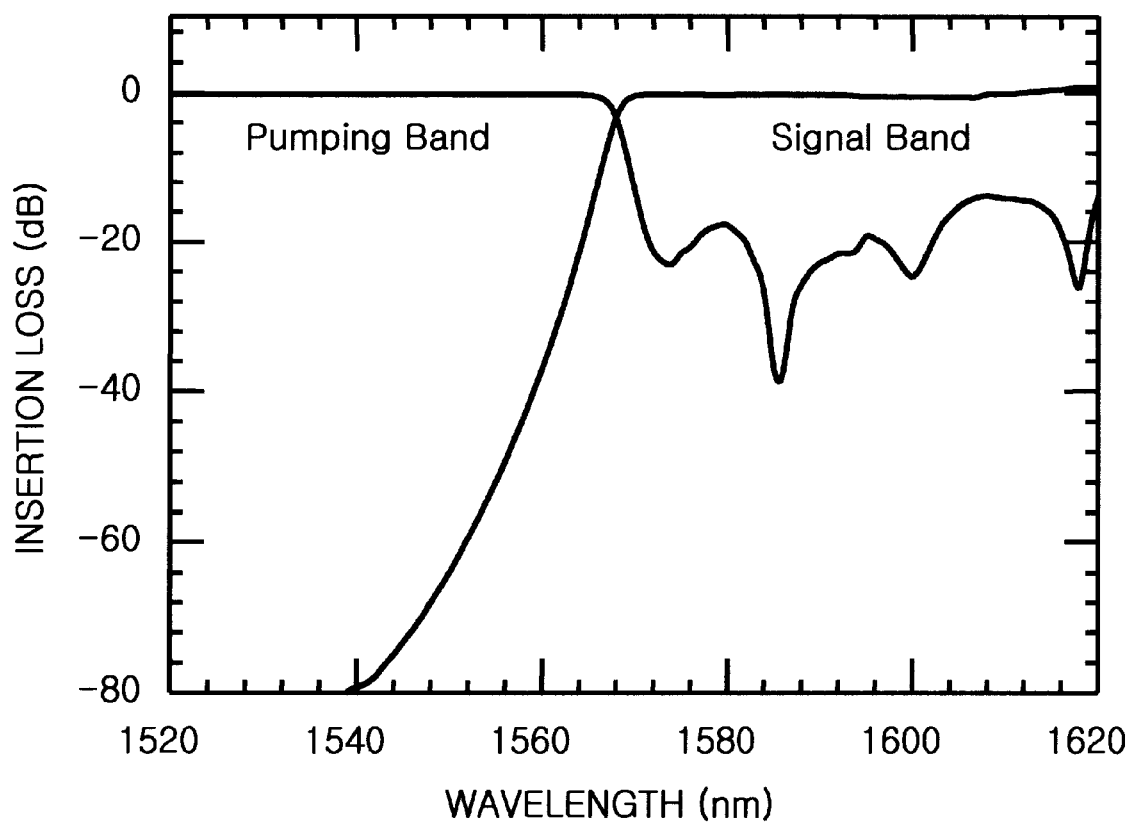
FIG. 6 is insertion loss spectra of WDM coupler multiplexing signal light and 1,530 nm wavelength band pumping light on pumping and signal light bands.

FIG. 6 is a graph representing the insertion loss spectra of WDM coupler 30, in which solid line is for pumping light port and dotted line is for signal light port. As shown in FIG. 6, the pumping light band and the signal light band is well separated. Since, however, the insertion loss of the pumping light has been increased near by 1,565 nm, the ASE noise light at near 1,560 nm wavelength can be passed into EDF through WDM coupler 30 so that amplification characteristics of the EDFA are deteriorated. In order to suppress the ASE noise, the OTF 80 is employed.

Figure 7:
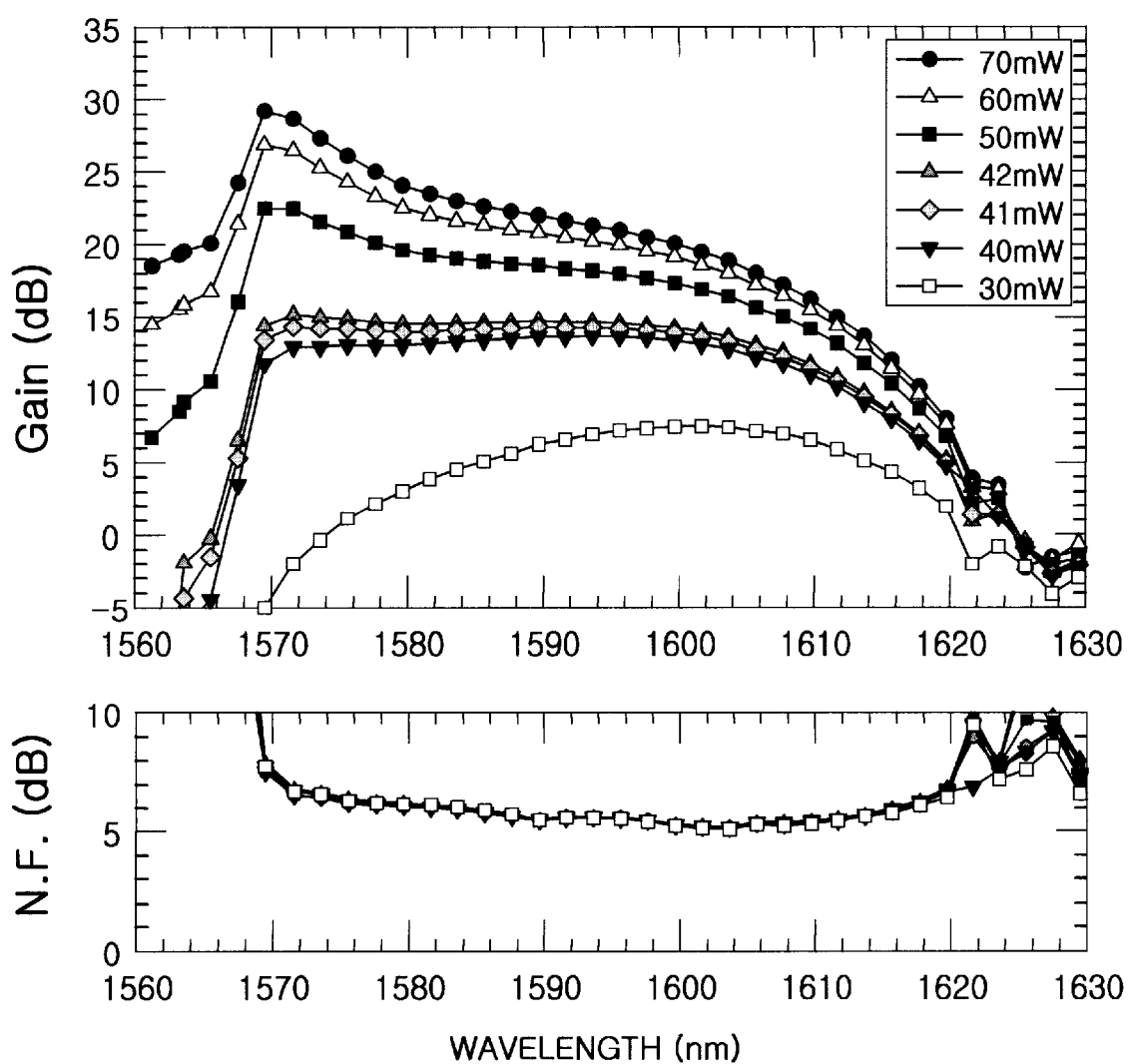
FIG. 7 shows a gain and a noise figure spectrum of the L-band EDFA which is pumped by 1,530 nm wavelength band pumping light.

FIG. 7 shows gain and noise spectra of the L-band EDFA of FIGS. 1 and 2. As shown in FIG. 7, when the EDFA is forward pumped by 1,533 nm pump wavelength and 44 mW pump power, 15 dB flat gain is achieved and the bandwidth is 30 nm with 1 dB excursion. The figure noise represents at worst 6.36 dB on signal band.

Figure 8:
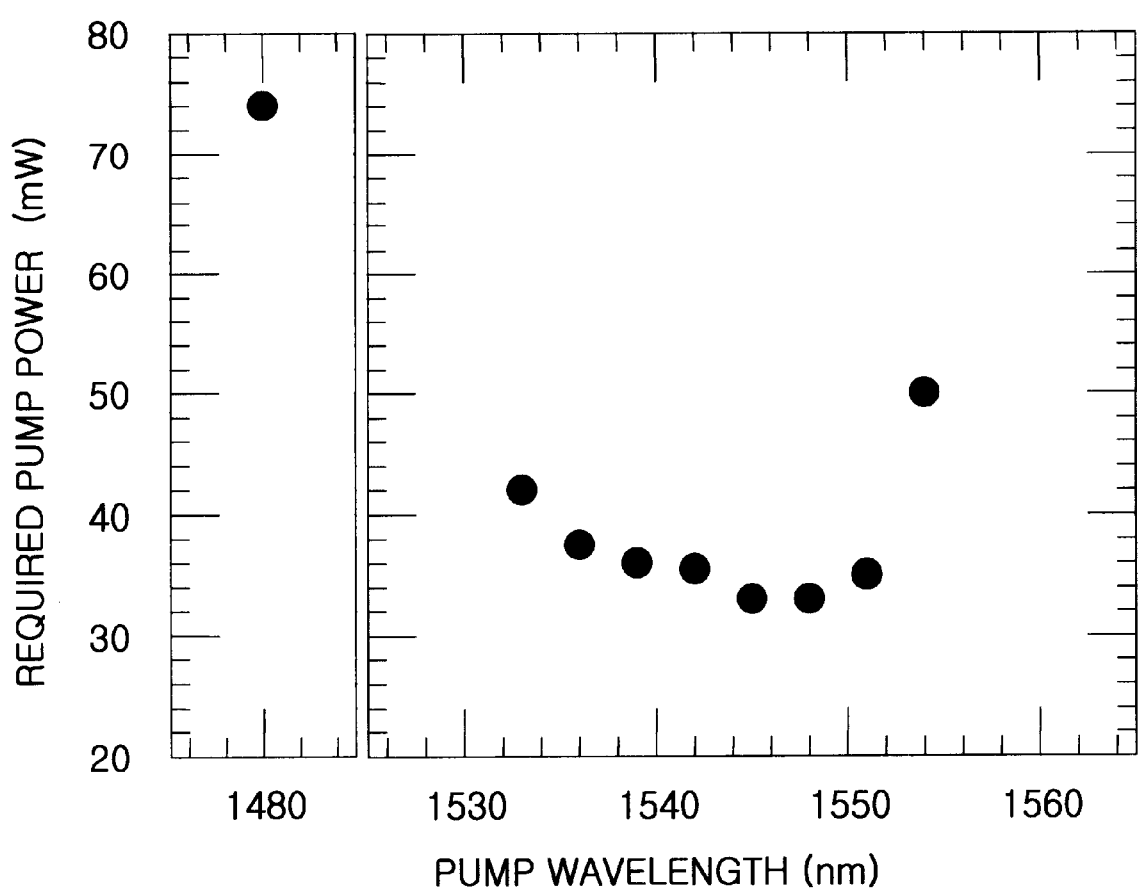
FIG. 8 shows the pump power required to attain a 15 dB flattened gain level at a signal band and its relative power conversion efficiency (PCE), respectively, with variation of pump wavelength in 1,530 nm band and in 1,480 nm.

FIG. 8 shows the pump power required to attain 15 dB flat gain at the L-band wavelength as a function of the pump wavelength. So as to investigate a wavelength-dependent characteristic of the pumping light at 1,530 nm wavelength band, the wavelength of the pumping light is varied with 3nm interval from 1,530 nm to 1,560 nm. The pump power required to attain 15 dB flat gain in the L-band between 1,571.5 nm and 1,601.5 nm is measured. In order to compare the results with conventional 1,480 nm wavelength pumping, 1,480 nm wavelength LD is replace with 1,530 nm pumpin unit 20 in FIG. 1 and the experiment is performed.

As a result, in case of 1,480 nm wavelength pumping, 74 mW is required, while the value of about 40 mW is required at 1,530 nm wavelength band pumping.

FIG. 8 also shows relative PCE in the case of the required power. The PCE is defined by the following equation:

In the above equation, $P_{out}$ is the power of the output signal light, $P_{in}$ is the power of the input signal light, and $P_{pump}$ is the power of the pumping light. The PCE means the efficiency to applied pumping power. By FIG. 8, the PCEs of the 1,530 nm wavelength band are about two times higher than that of 1,480 nm.

However, in case that the wavelength of the pump light is longer than 1,550 nm, the pump efficiency is deteriorated.

Figure 9:
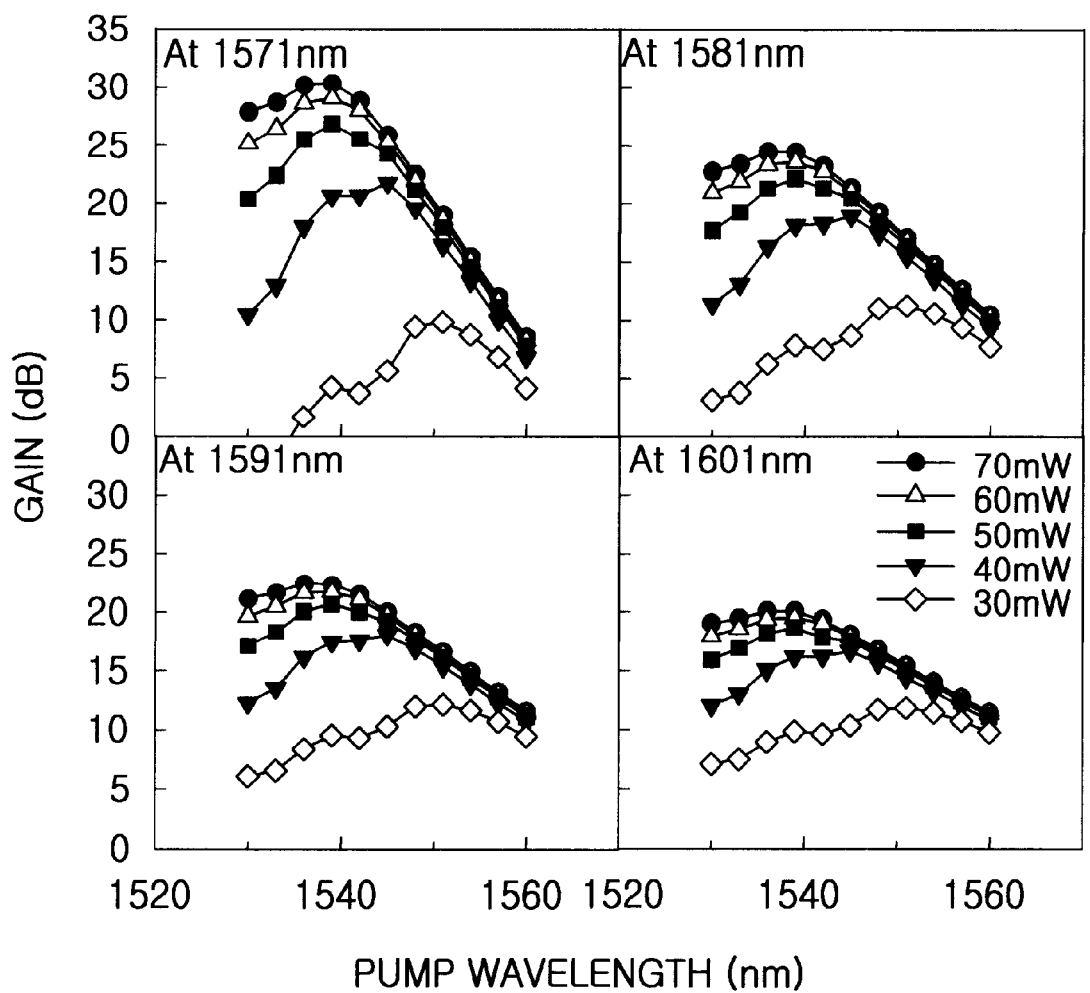
FIG. 9 describes a gain as functions of 1,530 nm-band pump wavelength and power at the signal wavelengths of 1,571.5 nm, 1,581.5 nm, 1,591.5 nm, and 1,601.5 nm.

FIG. 9 shows the gain versus pump wavelength for various pump powers and signal wavelengths of (a) 1,571.5 nm, (b) 1,581.5 nm, (c) 1,591.5 nm, and (d) 1,601.5 nm, respectively. Gain profiles for each signal wavelength show similar trends that pump wavelength to obtain the highest gain moves to shorter pump wavelength as the pump power increases, and a slope of the gain profile is steep on the longer pump wavelength side. This steepness is due to low absorption of the pump power. Considering this result together with that of FIG. 8, a wavelength between 1,530 nm and 1,540 nm is recommended as pump wavelength in the 1,530 nm-band for good amplification characteristics. Additionally another important thing comes from the fact that 3 dB bandwidth of the gain spectra is more than 10 nm. It means that broadband source, as well as single wavelength source can be used as 1,530 nm-band pump.

Figure 10:
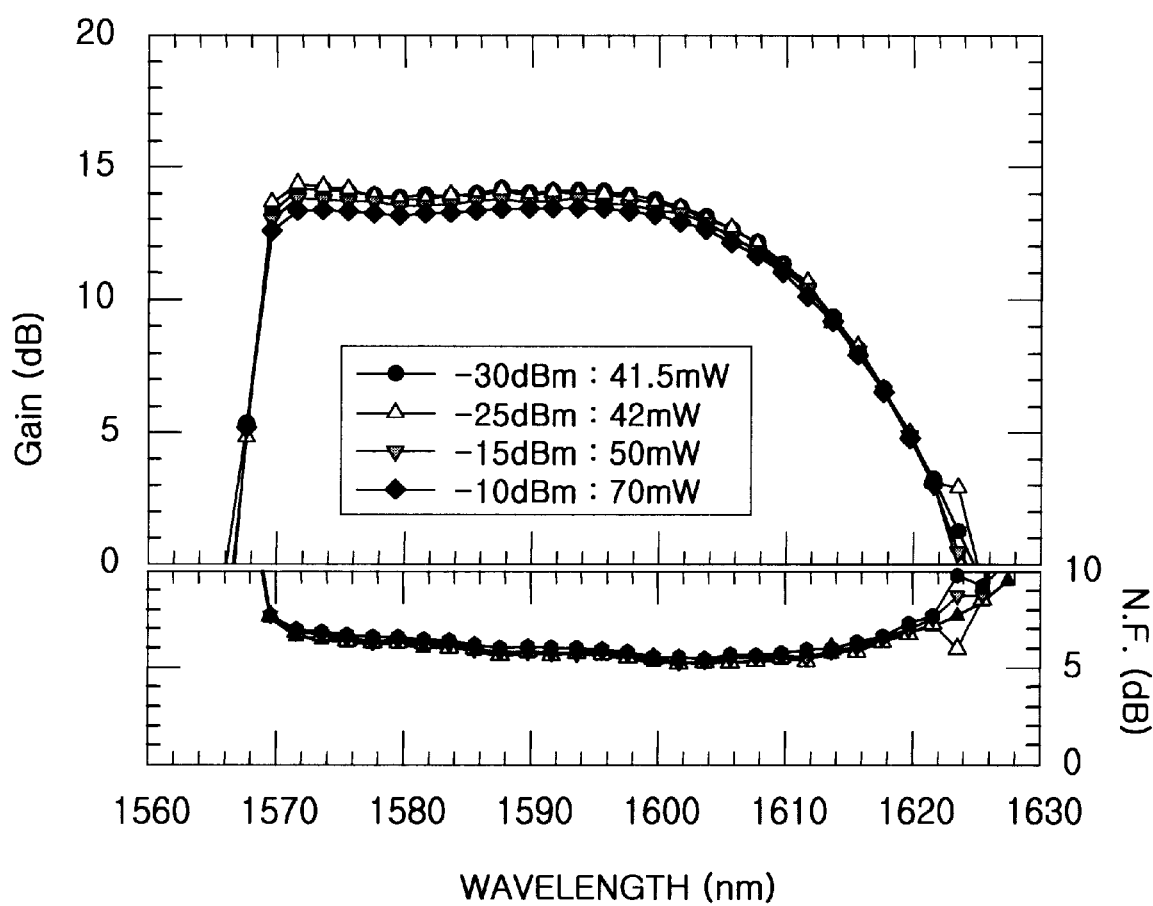
FIG. 10 is a gain and a noise figure spectra of a 1,533 nm pumped L-band EDFA for WDM signals which were composed of a probe signal and saturation tone.

FIG. 10 shows a gain and a noise figure spectra for the WDM signals. We use two coupled TLSs as input signal sources, which consist of a probe and a saturation tone in this experiment. The power of the saturation tone corresponds to the sum of power of 4 WDM signals and a wavelength of the saturation is 1,590 nm. 1,533 nm was used as the pump wavelength in this experiment. The power of a probe signal was varied from −30 to −10 dBm/ch and the pump power was 41.5, 42, 50 and 70 mW, respectively. The characteristics of a gain and a noise figure to WDM signals of −30 dBm/ch are the similar with those to a single signal in FIG. 7. It means that the L-band EDFA using 1,530 nm wavelength band pumping is applied to WDM signals.

As described above, the present invention employs 1,530 nm wavelength band pumping light to obtain a gain at L-band to improve efficiency of pumping power, i.e., PCE.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An L-band EDFA comprising:
   an input terminal for receiving signal light;
   a pumping unit for producing a 1,530 nm wavelength band pumping light;
   a WDM coupler for multiplexing the signal light and the pumping light; and
   an EDF pumped by the pumping light for amplifying the signal light,
   wherein the pumping unit has a first amplifying stage and a second amplifying stage,
   said first stage comprising a tunable light source that has a capability to change the wavelength of the pumping light, 980 nm wavelength laser diode for producing 980 nm wavelength pumping light, a first WDM coupler for forwardly multiplexing the output light from the tunable light source and the output light from the 980 nm wavelength band laser diode, and a first EDF for amplifying the light provided from the first WDM coupler,
   said second amplifying stage comprising a first 1,480 nm wavelength band laser diode for producing 1,480 nm wavelength band pumping light, a second WDM coupler for multiplexing the output light from the first stage and the pumping light from the first 1,480 nm wavelength band laser diode, a second 1,480 nm wavelength band laser diode for producing 1,480 nm wavelength band pumping light, a third wavelength division multiplexing unit for backwardly multiplexing the output light from the second 1,480 nm wavelength band laser diode and the output light from the second WDM coupler, a second EDF for amplifying the light provided from the second WDM coupler, and an optical tunable filter for reducing the amplified spontaneous emission noise light from the amplified light of the second erbium doped fiber,
   and, said L-band EDFA further comprises isolators to remove a reflection noise, each of which is located between the first amplifying stage and the second amplifying stage, and between the second amplifying stage and an output terminal.

2. An L-band EDFA as recited in claim 1, wherein the pumping light is produced by a 1,530 nm wavelength band laser diode.

3. An L-band EDFA as recited in claim 1, wherein the pumping light is produced by a 1,530 nm wavelength band laser diode in which the bandwidth of a spectrum is reduced by using an optical fiber Bragg grating or adopting a distributed feedback LD structure.

4. An L-band EDFA as recited in claim 1, wherein the wavelength band of the 1,530 nm wavelength band pumping light is between 1520 nm and 1,560 nm.

5. An L-band EDFA as recited in claim 1, wherein said wavelength division multiplexing unit is designed to enable an insertion loss of the pumping light to be large at longer wavelength than 1,560 nm.

6. An L-band EDFA as recited in claim 1, wherein said input terminal receives the signal light having 1570–1630 nm wavelengths.

7. An L-band EDFA as recited in claim 1, wherein the pumping unit utilizes one of a forward pumping having a same propagation direction with the signal light, a backward pumping having an inverse direction with the signal light, or a bi-directional pumping using both the forward and the backward pumping.

8. An L-band EDFA as recited in claim 7, wherein the bi-directional pumping has the forward pump having 980 nm or 1,480 nm wavelength band and the backward pump having 1,530 nm wavelength band.

9. An L-band EDFA as recited in claim 1, wherein an amplified spontaneous emission from the second EDF is eliminated by an optical circulator and an optical fiber grating.

10. An optical amplifier comprising:

a first stage having an input terminal to which a signal light is inputted, 980 nm wavelength laser diode for forward pumping 980 nm wavelength pumping light, a first WDM coupler for multiplexing the signal light and the 980 nm wavelength pumping light, and a first EDF pumped by 980 nm wavelength pumping light for amplifying the signal light provided from the first WDM coupler; and a said second amplifying stage having a first 1,530 nm wavelength band laser diode for forward pumping 1,530 nm wavelength band pumping light, a second WDM coupler for multiplexing the output light from the first EDF and the pumping light from the first 1,530 nm wavelength band laser diode, a second 1,530 nm wavelength band laser diode for backward pumping 1,530 nm wavelength band pumping light, a third WDM coupler for multiplexing the signal light and the output light from the second 1,530 nm wavelength band laser diode, and a second EDF bi-directionally pumped 1,530 nm wavelength band laser diodes by for amplifying the signal light, wherein, said amplifier further comprises two isolators to remove a reflection noise, each of which is located between the first amplifying stage and the second amplifying stage, and between the second amplifying stage and an output terminal.

* * * * *